United States Patent [19]
Ikegame et al.

[11] Patent Number: 5,841,593
[45] Date of Patent: Nov. 24, 1998

[54] OPTICAL SYSTEM SUPPORTING DEVICE WITH FLOWABLE DAMPING MATERIAL

[75] Inventors: Tetsuo Ikegame; Masayasu Kanazawa; Izumi Yamazaki, all of Hachioji, Japan

[73] Assignee: Olympus Optical Co., Ltd., Japan

[21] Appl. No.: 982,804

[22] Filed: Jan. 5, 1998

Related U.S. Application Data

[60] Continuation of Ser. No. 658,152, Jun. 4, 1996, Pat. No. 5,777,806, which is a division of Ser. No. 236,566, Apr. 29, 1994, Pat. No. 5,579,176.

[30] Foreign Application Priority Data

Apr. 30, 1993 [JP] Japan ..................................... 5-104395
Jun. 14, 1993 [JP] Japan ..................................... 5-167466

[51] Int. Cl.$^6$ .............................. G02B 7/02; G11B 7/00
[52] U.S. Cl. ...................... 359/823; 359/824; 369/44.15
[58] Field of Search .................. 359/814, 823, 359/824; 369/44.15, 44.16

[56] References Cited

U.S. PATENT DOCUMENTS

| | | | |
|---|---|---|---|
| 4,669,823 | 6/1987 | Iguma | 380/255 |
| 5,056,891 | 10/1991 | Masunaga | 359/813 |
| 5,208,703 | 5/1993 | Ikegame et al. | 359/813 |
| 5,323,369 | 6/1994 | Kim | 369/44.15 |
| 5,343,447 | 8/1994 | Okabe et al. | 369/13 |
| 5,488,603 | 1/1996 | Tomita et al. | 369/219 |
| 5,526,340 | 6/1996 | Tanaka | 369/219 |
| 5,604,641 | 2/1997 | Matsui | 359/824 |
| 5,636,068 | 6/1997 | Tanaka | 359/814 |
| 5,666,235 | 9/1997 | Izuka | 359/819 |

FOREIGN PATENT DOCUMENTS 3275157 10/1991 Japan.

Primary Examiner—Georgia Y. Epps
Assistant Examiner—Ricky Mack
Attorney, Agent, or Firm—Ostrolenk, Faber, Gerb & Soffen, LLP

[57] ABSTRACT

The optical system supporting device of the present invention comprises an optical element, a holding member for holding the optical element, a supporting member for displaceably supporting the holding member and a driving means for driving the holding member in a predetermined direction, wherein a holding part for gelatinous damping materials is provided on at least one place of the supporting member and a gelatinous damping material is disposed in the holding part. This optical system supporting device is small and light, and is excellent in cotrollability. The optical system supporting device of another embodiment of the present invention comprises an optical element, a holding member for holding the optical element, a fixing member and a connecting member for connecting the holding member and the fixing member, a damping means being provided on at least one place of the connecting member, wherein the damping means comprises a liquid or gelatinous damping material applied around the connecting member, said connecting member being provided with a resistance increasing means at its part positioned in the damping material. With this optical system supporting device high damping performance can readily be obtained and setting of a coefficient of damping can freely be made.

8 Claims, 15 Drawing Sheets

OPTICAL SYSTEM SUPPORTING DEVICE WITH FLOWABLE DAMPING MATERIAL

This is a continuation of application Ser. No 08/658,152, filed Jun. 4, 1996, now U.S. Pat. No. 5,777,806 which is a division of application Ser. No. 08/236,566, filed Apr. 29, 1994 now U.S. Pat. No. 5,579,176.

BACKGROUND OF THE INVENTION

1. Field of The Invention

The present invention relates to an optical system supporting device. More particularly, the present invention is concerned with a supporting device suitable for supporting an optical system, such as an objective lens system, through which a light spot is projected on a data recording medium in an optical data recording and/or reproducing apparatus, such as an optical disk unit.

2. Discussion of Related Art

In the above type of optical system supporting device, it is necessary to drive up or down an optical element, such as an objective lens, in accordance with any vibration and inclination of, for example, the surface of the optical disk. Therefore, in the conventional device, a holding member that holds an objective lens is displaceably supported by a connecting member composed of, for example, a plurality of wire springs or the like, and driven and controlled in the focal and tracking directions by an electromagnetic coil. However, this driving system drives the lens in the two dimensional direction, i.e., either sideways or up and down, to thereby form a secondary vibration system. Thus, for attaining stable control, it is necessary to effectively suppress a primary resonance.

Therefore, for conducting a stable control, it has been proposed to provide a damping means on a supporting mechanism to thereby suppress the undesired resonance.

As one of the above-mentioned damping means, a gelatinous damping material may be mentioned.

If, instead of a damping material made of a rubber, a gelatinous damping material is applied to an edge of a linear wire spring generally used as a supporting member in an optical system supporting device, simple coating of the edge with the gelatinous damping material results in sagging of the damping material, which causes a problem of dispersion in properties. Under such circumstances, for example, Japanese Patent Publication Laid-Open Specification No. 232824/1990 (Reference 1) discloses a device provided with having a gel-filled holding member. The structure of this device is summarized below.

In FIGS. 13A and 13B showing the structure of the conventional device, an objective lens 101 is fixed to a lens holder 102. Both ends of each of four metallic wires 103 arranged in parallel are soldered by solder 107 to a base substrate 105 fixed to a base 104 and a holder substrate 106 fixed to the lens holder 102. Thus, the lens holder 102 is supported in a cantilever manner.

A damper case 108 having two holes forms a fixing part side in combination with the base 104. A gelatinous damping material 109 (which is a gel mainly composed of thermosetting or UV-curable silicone) is filled and held in these holes of the damper case 108. A pin 102a formed in a part of the lens holder 102 is inserted in the damping material 109.

Further, the above Reference 1 discloses another structure shown in FIGS. 14A and 14B. In this structure as well, a container type structure is used for holding the gelatinous damping material. The gelatinous damping material 109 is filled and held in the container type structure formed in a part of the lens holder 102, through which the wires 103 are arranged. Also, the gelatinous damping material 109 is filled and held in the container type structure formed in a part of the base 104, through which the wires 103 are arranged.

Moreover, as the damping means for the supporting member of the optical system supporting device, in addition to the gelatinous damping material, the use of a rubber and the like is well known as disclosed in, for example, Japanese Patent Publication Laid-Open specification No. 73426/1991 (Reference 2).

In the damping means for the supporting member in this Reference 2, a plate spring structure is used as shown in FIG. 15. A plate spring 201 is formed in a thickness of about 0.1 mm, which is of an almost linear shape excluding both ends of the main body thereof. Fixing parts 202 and 203 are provided in the vicinities of the both ends, respectively. In these fixing parts, holes 204 and 205 are formed for positioning in the fixing. Projecting parts 206 and 207 of the both ends are respectively soldered to the end of a focal or tracking coil and FPC for power supply to thereby supply power.

A spring part 208 is formed in the center of one fixing part 203 along the direction of the extension of the plate spring 201. A projecting part 209 projected in the direction of the extension of the plate spring 201 is formed on both sides of the spring part. Further, a projecting part 210 projected rectangularly to the direction of the extension of the plate spring 201 is formed on the tip of the spring part 208.

Further, a supporting part 211 tapered along the direction of the extension of the plate spring 201 is formed on the other fixing part 204 on its side of the direction of the extension of the plate spring 201. The supporting part 211 and the projecting part 210 are connected by a long spring part 212 therebetween so that almost the whole part of the plate spring 201 can be deformed with the spring part 208 in the focal and tracking directions.

A damper material 213 composed of a butyl rubber is provided on almost the whole parts in the vicinities of the spring part 208 and projecting parts 209 and 210 continuous from the one fixing part 203, almost the whole part in the vicinity of the supporting part 211 continuous from the other fixing part 204 and the whole part of the long spring part 212. The part of the damping material 213 corresponding to the long spring part 212 is formed so as to have a small width.

Therefore, in an optical data recording and/or reproducing device, the minimization and speed increase are essential for the realization of the higher performance therefor. Accordingly, it is highly demanded to render an optical system supporting device for use therein smaller and lighter.

However, in the constructions as shown in FIGS. 13 and 14 of the above Reference 1, the container type structure is required for holding the gelatinous damping material. When such a container type structure is provided on the holding member or the fixing member, this member becomes large. Further, when the holding member for the damping material is provided using another part, not only the number of parts is increased but also the optical system supporting device becomes large. Thus, the conventional constructions have a problem that the optical system supporting device or the movable part thereof becomes inevitably large, so that it is unattainable to render the device smaller and lighter.

In particular, when a higher damping performance is required for the device of FIG. 14, the only measure is to increase the length of the filling part for the damping material to thereby enlarge the contact area with the connecting member. This, however, causes the problems that the external shape of the device becomes large and the weight thereof increases. Further, it is difficult to independently set or alter the coefficient of damping alone.

For example, when the length of the filling part for the damping material is increased, this affects the effective length and movable range of the connecting member, etc. to thereby cause design freedom to be poor.

Further, in the device as disclosed in the Reference 2, the rubber damping material is generally integrally formed with the supporting member, using a mold. On the other hand, the gelatinous damping material is immobilized by first potting the same at an appropriate site of the supporting member, and then, curing by irradiation with ultraviolet rays or by heating.

Thus, when the gelatinous damping material is applied onto the supporting member as disclosed in the Reference 2, the coating is performed on the plate spring as shown in FIG. 15. However, the coating of the plate spring with damping material inevitablly causes the damping material to flow around the plate spring-so as to spread thinner, thereby bringing about the risk that the required performances cannot be obtained. Further, in the Reference 2, no particular consideration is given to the distance between the spring part and the projecting part and so on.

When a supporting member composed of inexpensive linear wires is used instead of the above-mentioned plate spring, only the application of the gelatinous damping material to an edge of the spring without providing the container type structure as disclosed in the Reference 1 also causes the damping material to flow out, so that it is difficult to obtain stable performance. Therefore, in the prior art, it is extremely difficult to obtain an optical system supporting device having a structure desirable not only in terms of controllability but also in terms of minimization and weight reduction by the combination of the gelatinous damping material with the wire as the supporting member.

SUMMARY OF THE INVENTION

It is an object of the present invention to provide an optical system supporting device which is free from the above drawbacks of the prior and, anc which is not only small and light but also excellent in controllability.

Further, another object of the present invention is to provide an optical system supporting device with which improved damping performance can readily be obtained and the coefficient of damping can freely be set.

The foregoing and other objects, features and advantages of the present invention will become apparent from the following detailed description and appended claims taken in connection with the accompanying drawings.

DETAILED DESCRIPTION OF THE INVENTION

The optical system supporting device according to the first embodiment of the present invention comprises an optical element, a holding member for holding the optical element, a supporting member for displaceably supporting the holding member and a driving means for driving the holding member in a predetermined direction, wherein a holding part for gelatinous damping materials is provided on at least one place of the supporting member and a gelatinous damping material is disposed in the holding part.

According to the present invention, by providing a part holding a damping material on the member supporting the member holding an optical element, the damping material can be arranged in the supporting member without the head of making the member larger and adding a special member for holding the damping material as required in the conventional device.

Therefore, an optical system supporting device being smaller and lighter and having excellent controllability can be obtained, and thus can meet the demand for an optical data recording and/or reproducing device being miniaturized but exhibiting a high performance.

The optical system supporting device according to the second embodiment of the present invention comprises an optical element, a holding member for holding the optical element, a fixing member and a connecting member for connecting the holding member and the fixing member, a damping means being provided on at least one place of the connecting member, wherein said damping means comprises a liquid or gelatinous damping material applied around the connecting member, said connecting member being provided with a resistance increasing means at its part positioned in the damping material.

In the second embodiment, the resistance increasing means is composed of, specifically, an enlarged or extended part, an expanded part or an opening provided on a part of the connecting member.

In the optical system supporting device having the above-mentioned structure according to the present invention, the resistance increasing means acts to increase the contact area between the connecting member and the damping material to thereby improve the damping performance. Further, the coefficient of damping in each of the X, Y and Z directions can freely be set by changing the shape, size and position of the resistance increasing means.

Preferred Embodiment of The Invention

The present invention will now be described in greater detail with reference to the following Examples, which should not be construed as limiting the scope of the present invention.

Various forms of optical system supporting devices according to the first embodiment of the present invention will now be described with reference to the appended drawings. In the description of the drawings, like parts or elements are given like numerals to avoid repetitions of description.

Figure 1:
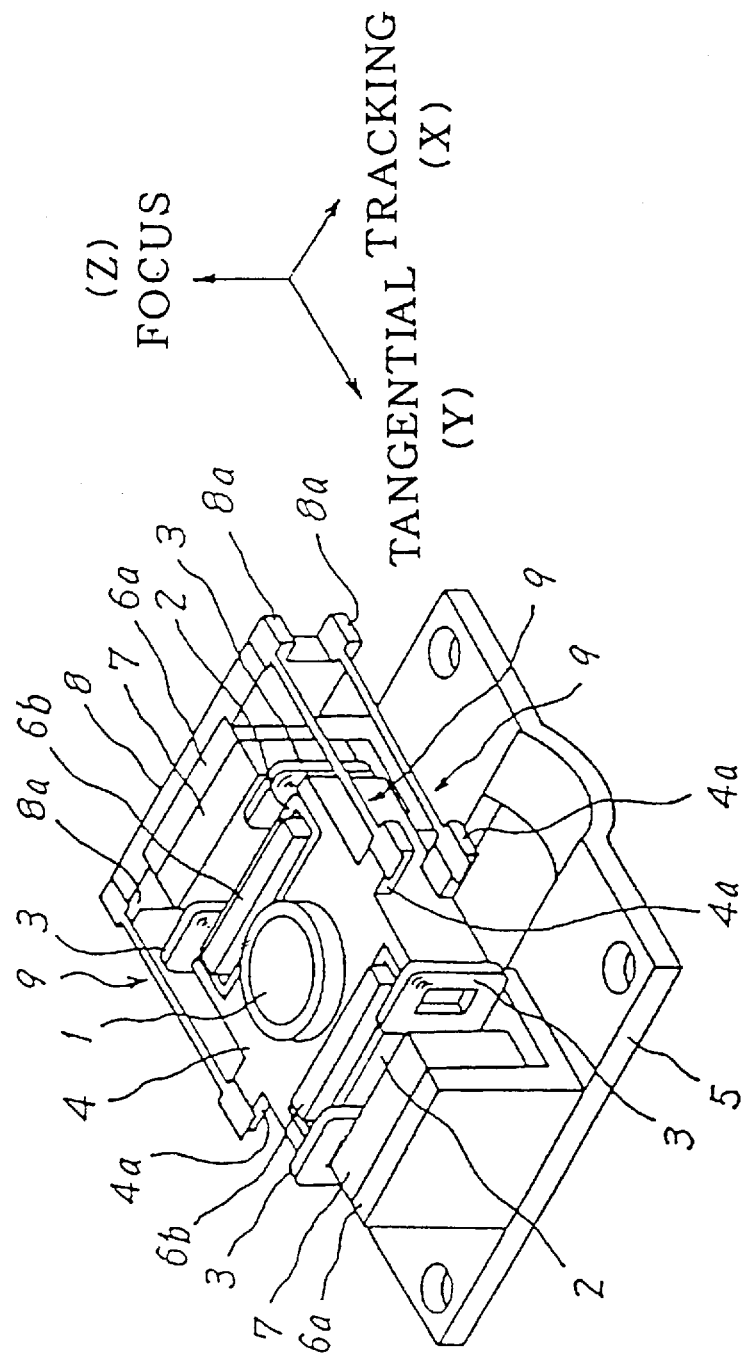
FIG. 1 is a perspective view of the whole structure of one form of optical system supporting device according to the first embodiment of the present invention.
Figure 2:
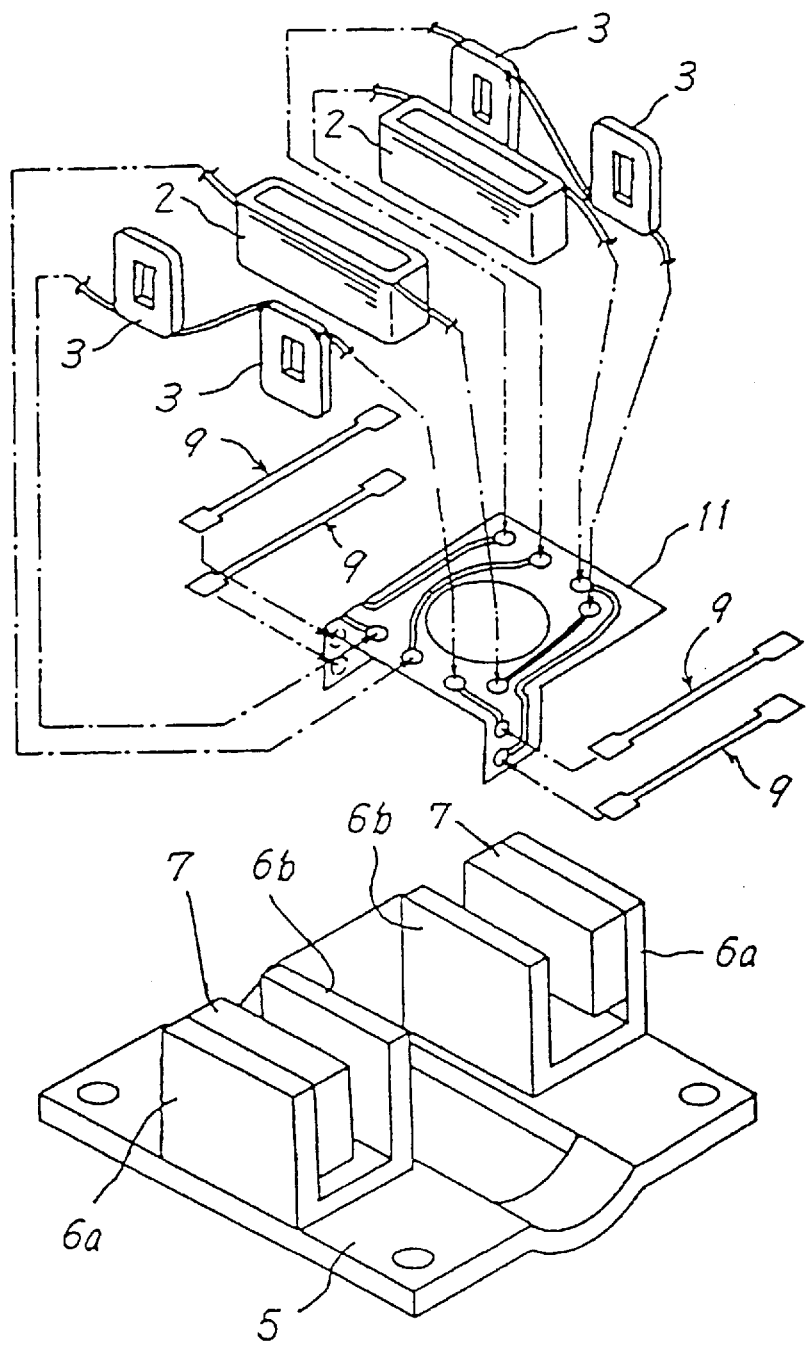
FIG. 2 is an explanatory view illustrating the coil connection in the device of FIG. 1.
Figure 3:
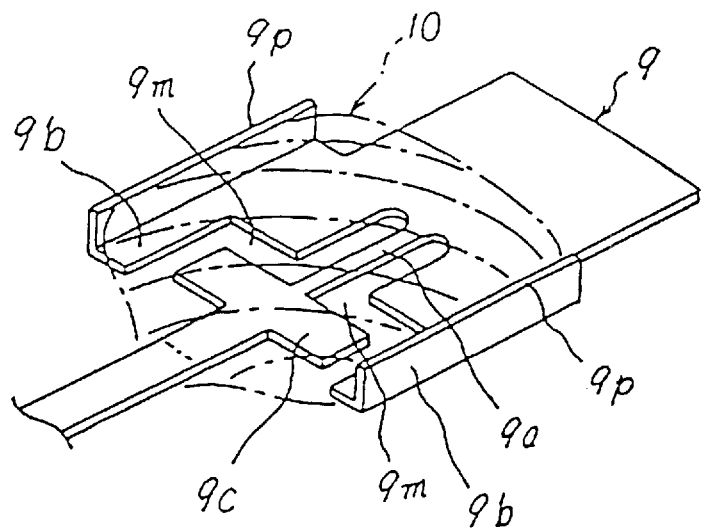
FIG. 3 is a detailed explanatory view illustrating an edge of spring in the device of FIG. 1.

FIGS. 1 to 3 illustrate one form of optical system supporting device (Example 1) according to the first embodiment of the present invention. FIG. 1 is a perspective view of the whole structure of the optical system supporting device. FIG. 2 is an explanatory view illustrating the connection of coils. FIG. 3 is a detailed view of a spring edge.

In FIG. 1, reference numeral 1 denotes an objective lens for focusing a light spot on a data recording medium in the optical data recording and/or reproducing device. Objective lens 1 is fixed to the upper surface of holding member 4 for holding the objective lens. In this Example, focusing coil 2 and tracking coil 3 are bonded onto each of both side surfaces, in the tangential direction (Y), of holding member 4. Further, in this Example, holding member 4 also has spring fixing parts 4a each provided on the top and bottom of each of both side surfaces, in the tracking direction (X), thereof.

Base 5 is formed by molding a sheet metal or a resin. Onto the surface of base 5, outside yokes 6a and inside yokes 6b which are formed by bending a sheet metal are fixed. Magnet 7 is fixed to the inside of outside yokes 6a. Two sets of magnetic circuits are arranged in positions symmetrical about objective lens 1 in the tangential direction (see FIG. 2).

In this Example, the means for driving holding member 4 for holding objective lens 1 as an optical element comprises the above magnetic circuits, focusing coil 2 and tracking coil 3.

Further, fixing member 8 is fixed to the outside of one of outside yokes 6a. Fixing member 8 has spring fixing part 8a on each of its four corners.

In this Example, four plate springs 9 (see FIG. 2) formed by pressing a metal plate are used for displaceably supporting holding member 4 (detailed structure thereof will be described referring to FIG. 3 below). One end of each spring 9 is bonded to fixing part 4a of holding member 4, and the other end thereof is bonded to fixing part 8a of fixing member 8, thereby supporting holding member 4 in a cantilever manner so as to allow the same to move in Both of the focal direction (Z) and the tracking direction (X).

Holding member 4 is supported in a manner such that inside yoke 6b fixed to base 5 is positioned in the hollow of tracking coil 3 fixed to a side surface of holding member 4.

The electrical connection of coils fixed to the above-mentioned holding member 4 is as shown in, for example, FIG. 2. As shown in FIG. 2, focusing coil 2 is formed with an air-core coil, and tracking coil 3 is formed with a double coiled air-core coil. As shown in FIG. 1, each of these is bonded to holding member 4.

In this Example, each of the terminals of the above two focusing coils 2 and two tracking coils 3 is soldered to trunk substrate 11 for connection in series. On the other hand, the tip of each spring 9 is soldered to trunk substrate 11 to thereby electrically connect the same to the fixing member side of the optical system supporting device through the four springs of metal plates.

Thus, each coil 2 or 3 can be supplied with power to thereby have a structure in which objective lens 1 is driven to the predetermined position with the use of the electro-magnetic power generated by the magnetic circuits.

The detail of an edge of spring 9 used for supporting holding member 4 and for electrical connection to supply power to each of coils 2 and 3 as described above is as shown in FIG. 3 and has a slit structure. Spring 9 is formed by pressing a plate of a metal, such as beryllium-copper or the like. Spring 9 is in the form of a beam slender throughout its nearly entire length, as its outline shape is shown in FIGS. 1 and 2.

As shown in FIG. 3, beam formed spring edge 9a is provided in the vicinity of the fixing part of each of both edges of the spring. The width of spring edge 9a is made slender from the center part. Projecting parts 9b projected in the direction of the extension of spring 9 are provided on both sides of spring edge 9a. Projecting parts 9c projected in the direction almost perpendicular to the direction of the extension of spring 9 are provided on the center spring 9, adjacent to projecting parts 9b. The tips of both projecting parts 9b projected in the direction of the extensions of spring 9 reach the position almost exceeding the place at which projecting parts 9c are formed as shown in FIG. 3. The tips of projecting parts 9c oppose the respective inside parts of projecting parts 9b.

Further, bent (L-shaped) interstice 9m formed between spring edge 9a and projecting parts 9b and 9c is set to be as narrow as, for example, from about 0.05 to 0.5 mm, so that when applied, the gelatinous damping material does not flow out by the surface tension as described hereinbelow.

Still further, each outer side of both projecting parts 9b are bent as shown in FIG. 3, thereby providing wall parts 9p on the side surfaces of projecting parts 9b.

In this Example, after the formation of each spring 9 into the shape as described above, gelatinous damping material 10 curable by irradiation with ultraviolet rays, etc. is applied to the edge portion of the structure as shown in FIG. 3, and cured. Using the thus obtained four springs 9, assembly and electrical connection are conducted as shown in FIGS. 1 and 2.

Next, the damping function of the optical system supporting device in this Example will be described.

In the optical data recording and/or reproducing device comprising the optical system supporting device having the above-mentioned structure, reading and writing of data are performed by projecting a light flux emitted from an optical unit (not shown) comprising a light emitting element such as LD and a light receiving element on the surface of a recording medium through objective lens 1 on holding member 4 of the optical system supporting device of FIG. 1.

In the above recording and reproduction, by supplying power to the appropriate coils through springs 9, objective lens 1 is driven to the predetermined position at the time controlling the focusing and tracking, as described above. At this time, when the movable part of the device comprising holding member 4 is displaced, the spring edge 9a is deformed, to thereby cause deformation of the damping material 10 held on spring edge 9a and projecting parts 9b and 9c as shown in FIG. 3. Thus, vibrational energy is absorbed. Further, when the movable part of the device experiences rolling resonance, torsional deformation occurs at spring 9. However, this deformation is enlarged by the projecting prats 9c provided nearly perpendicularly to the direction of extension of spring 9, so that a high damping effect can be obtained against the rolling resonance as well.

In the optical system supporting device according to this Example in which a holding part for damping material 10 is provided at spring edge 9a and gelatinous damping material 10 is disposed in the holding part, if the spring is a flat plate spring, damping material 10 is appropriately held thereto, resulting in desirable damping performance. It is not necessary to provide a structure for holding the gelatinous damping material on holding member 4 or fixing member 8. As mentioned above, interstice 9m between spring edge 9a and projecting parts 9b and 9c is so narrow as to prevent the damping material from flowing out by surface tension. In the application, some amount of the damping material flows at the interstice in the direction of the extension of spring 9, but most of the damping material is held by wall parts 9b set up at the side surface of projecting parts 9b.

Therefore, as contemplated hereinbefore, it can be avoided that the damping material applied onto the plate spring flows out around the plate spring to thinly spread, thereby obtaining desired properties difficult. Further, since the deformation of spring 9 is concentrated in the vicinity of spring edge 9a shown in FIG. 3, the damping material having flowed in the direction of the extension of spring 9 has no marked effect on the properties.

Therefore, this structure ensures stable controllability by appropriately damping any primary resonance and other secondary resonances of the movable part of the device.

According to the present invention, an optical system supporting device can be obtained which not only ensures stable controllability but also is suitable for objective lens 1 coping with a small and lightweight light pickup unit.

In the present invention, it is not necessary to enlarge holding member 4 or fixing member 8 or to add special members for holding the damping material. Thus, gelatinous damping member 10 can be appropriately provided without increasing the number of parts. Therefore, stable controllability can be attained and miniaturaization and weight reduction can be realized for the optical system supporting member and the movable part thereof, so that it is possible to easily meet the demands for miniaturization and speed increase of an optical data recording and/or reproducing device.

In this Example, damping material 10 is provided on both edges of spring 9 in the vicinity of fixing parts. However, the application of damping material 10 may be conducted to only either of both edges.

Figure 4:
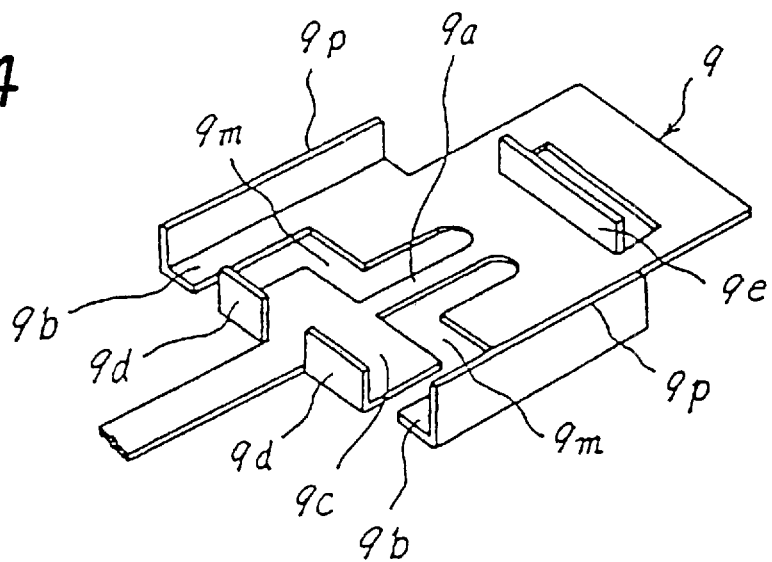
FIG. 4 is a view showing a modified form of the above edge of spring.

FIG. 4 shows a modification of the above Example (Example 1).

In this Example, as shown in FIG. 4, the above structures of both spring edges 9a are further provided with wall parts 9d and 9e. The addition of wall parts 9d and 9e restricts the flow of the applied gelatinous damping material in the direction of the extension of spring 9, 50 that greater effect can be obtained.

In this Example as well, by providing the holding part of damping material 10 in the vicinity of spring edge 9a as the supporting member, the damping material can be arranged in the supporting member without the need of enlarging the member for holding the damping material or adding any special member. Thus, not only an optical system supporting device which is small and light and has excellent controllability can be realized but also the light pickup unit can be miniaturized and rendered lightweight, thereby leading to miniaturization and performance improvement of an optical data recording and reproducing device.

Figure 5:
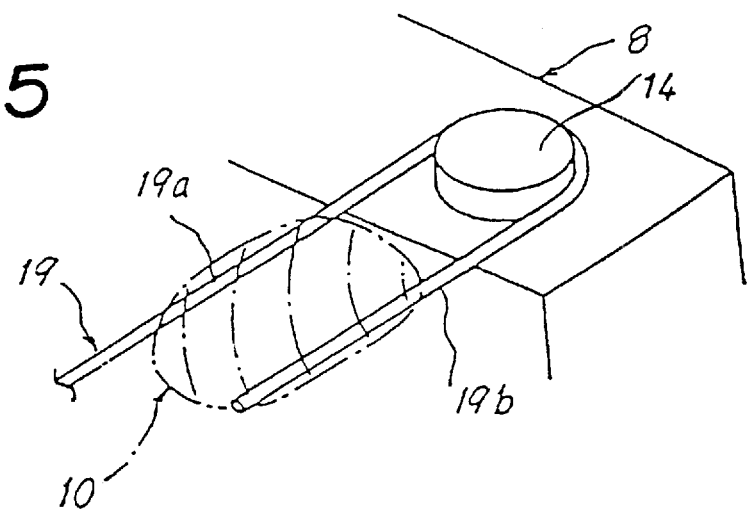
FIG. 5 shows a key portion, in particular being an enlarged view of the vicinity of the spring fixing end, in another form of optical system supporting device according to the first embodiment of the present invention.

FIG. 5 shows another form of optical system supporting device (Example 2) according to the present invention.

In this Example, an inexpensive metallic wire is used as a supporting spring, instead of the plate spring used in Example 1. FIG. 5 is an enlarged view of the wire spring around its fixed end.

The tip of wire spring 19 is bent to have a J shape at its end portion 19a as shown in FIG. 5. On the other hand, spring fixing parts 4a and 8a of holding member 4 and fixing member 8 shown in FIG. 1 are each provided with boss 14 for positioning, which is engaged with the bent tip portion of spring 19 to immobilize the same.

Gelatinous damping material 10 is applied between the spring end portion 19a and projecting part 19b extending nearly in parallel with the direction of the extension of spring 19, formed by bending the tip of spring 19.

The distance between spring end portion 19a and projecting part 19b is so set as to be in a range in which the applied damping material does not flow out by surface tension and is held between spring end portion 19a and projecting part 19b, for example, at about 0.5 to 1 mm. The other structural features are the same as in Example 1.

In the optical system supporting device according to this Example, when the movable part of the device is displaced, the damping material 10 held between spring 19 and projecting part 19b is deformed in accordance with the deformation of spring end portion 19a, so that vibration is absorbed, thereby inhibiting the undesired resonance of the movable part of the device.

Figure 13A:
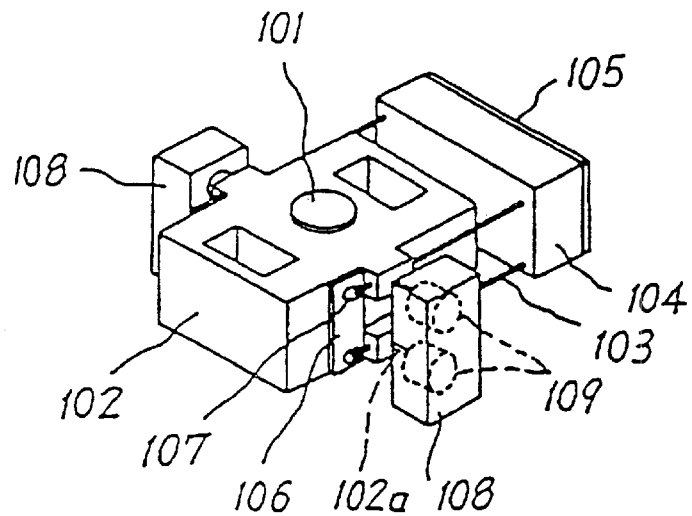
FIG. 13 is a view showing one form of conventional device.
Figure 13B:
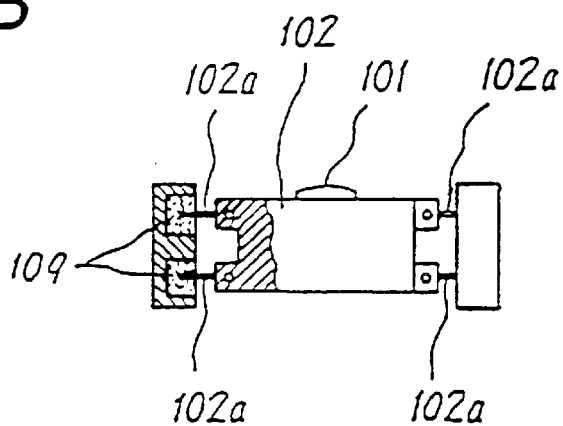
Figure 14A:
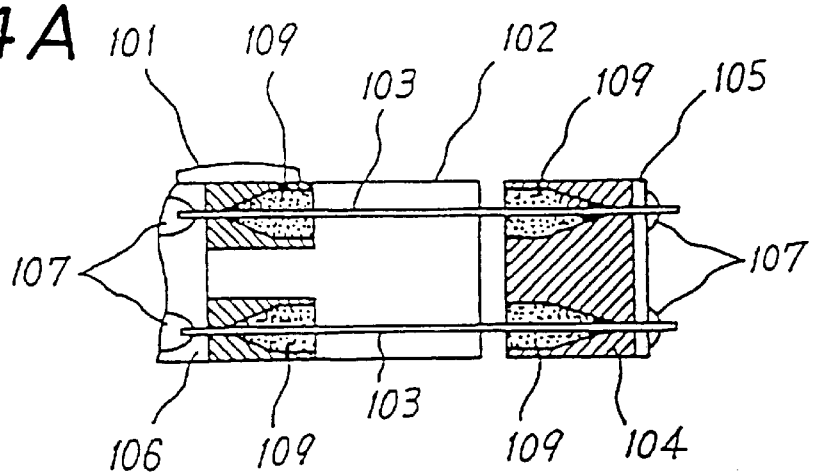
FIG. 14 is a view showing another form of conventional device.
Figure 14B:
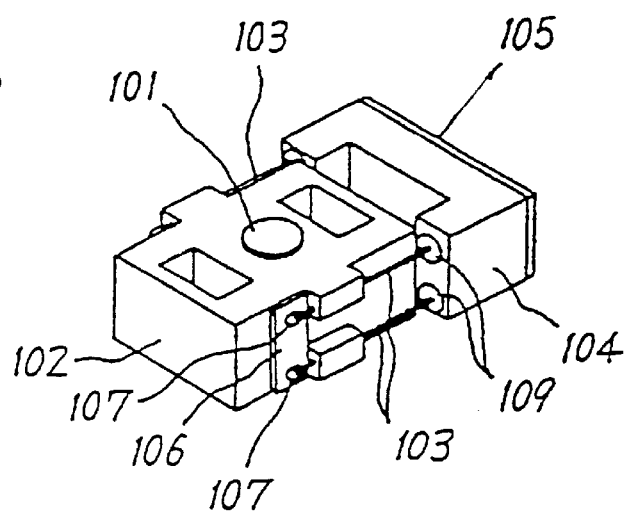
Figure 15:
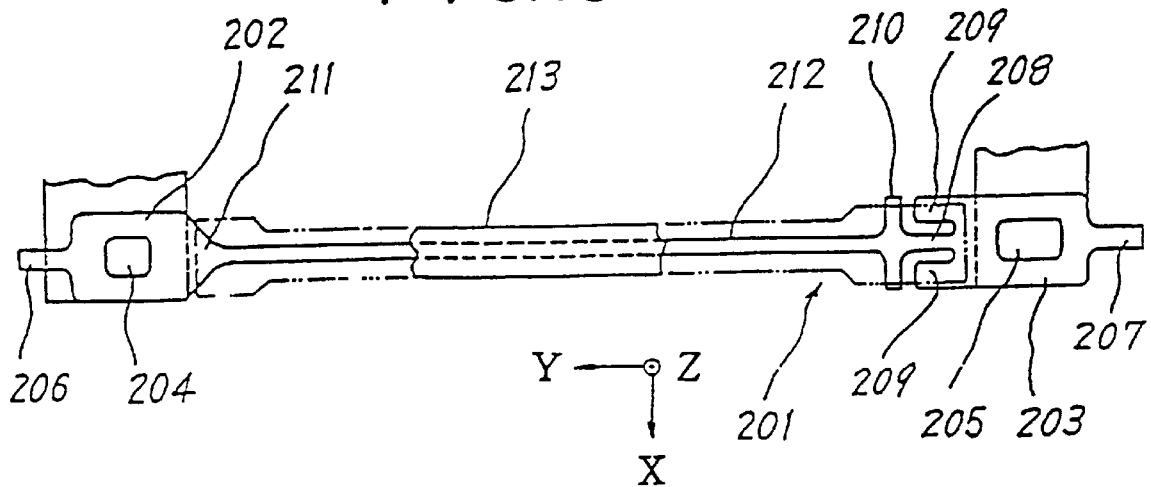
FIG. 15 is a view showing still another form of conventional device.

In this Example using a wire spring as well, holding member 4 and fixing member 8 have no conventional container type structure for holding the gelatinous damping material as shown in FIGS. 13 and 14. The optical system supporting device can be small and light, and thus, it is found that by combining the wire as the supporting member with the gelatinous damping material according to the structure of this Example, the optical system supporting device of the present invention can be realized.

According to this Example, also, the gelatinous damping material can be provided without the need of enlarging the holding member and the fixing member or adding any further special part for holding the damping material. Therefor, not only can stable controllability be obtained, but also the optical system supporting device and the movable part thereof can be small and light. Further, the wire spring is used, so that cost reduction can be attained.

Next, still another form of optical system supporting device (Example 3) of the present invention will be described with reference to FIGS. 6 to 8.

The device of this Example is the same as in Example 1, except that the electrical connection of coils and the shape and structure of the spring are changed as described below. The major features of this Example will be described below.

Figure 6:
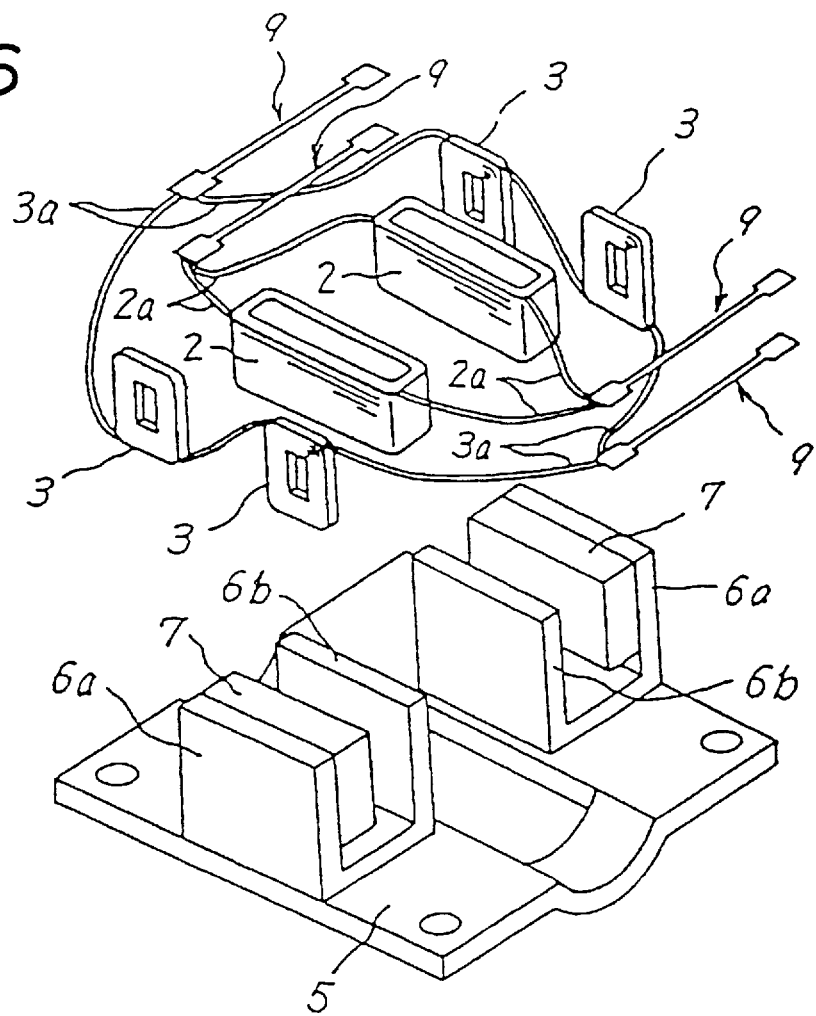
FIG. 6 shows a key portion, in particular being an explanatory view for the electrical connection of coils, in still another form of optical system supporting device according to the first embodiment of the present invention.

First, with respect to the electrical connection of coils, FIG. 6 shows the manner of electrical connection of coils 2, 3 fixed to holding member 4 in this Example. Focusing coil 2 is composed of an air-core coil, and tracking coil 3 is composed of a double air-core coil. Each of these is bonded to holding member 4 as in Example 1.

Figure 7:
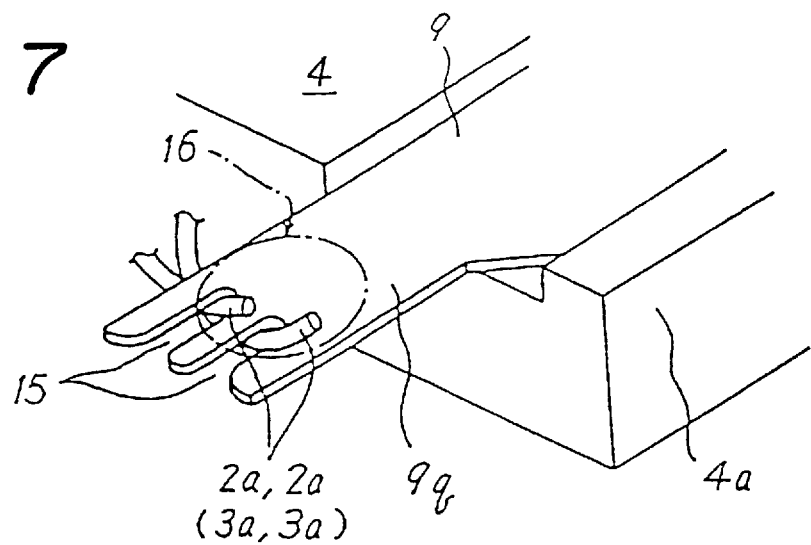
FIG. 7 is a detailed view of the soldered part of a spring edge in the device of FIG. 6.

In this Example, as shown in FIGS. 6 and 7, two focusing coils 2, and also two tracking coils 3 are connected in parallel, and the terminals 2a, 3a of coils 2, 3 are directly soldered to the tips of springs 9 (tip on the side of the holding member 4).

Illustratively stated, FIG. 7 is a detailed view showing the vicinity of the soldering portion of the tip of a spring. Spring 9 is so formed that a part of the tip of the spring extends beyond fixing part 4a on the side of the holding member. As shown in FIG. 7, two grooves 15 each having a width nearly equal to the diameter of the wire of the coil used are provided in the direction of the extension of spring 9 on the edge of tip 9q, All of four springs 9 in FIG. 6 have each the above grooves 15 at tip 9q thereof. For each spring 9, terminals 2a and 2a, and terminals 3a and 3a on each terminal side (one terminal side or the other terminal side) of two focusing coils 2 and 2 and two tracking coils 3 and 3 are hooked and soldered with solder 16 to the grooves as shown in FIG. 7.

In Example 1, the coil terminals are connected with each other in series through trunk substrate 11. Such connection may usually be performed. However, in this Example, trunk substrate 11 is not required, so that the number of parts can be reduced. Further, as shown in FIG. 7, two coil terminals (i.e., termials 2a and 2a, or terminals 3a and 3a) can be directly soldered at one time to spring 9, so that the number of soldered points can be reduced, thereby reducing the number of work items.

Further, since the space for attaching the trunk substrate is not required, there is an advantage in that miniaturization of holding member 4 is facilitated.

Figure 8:
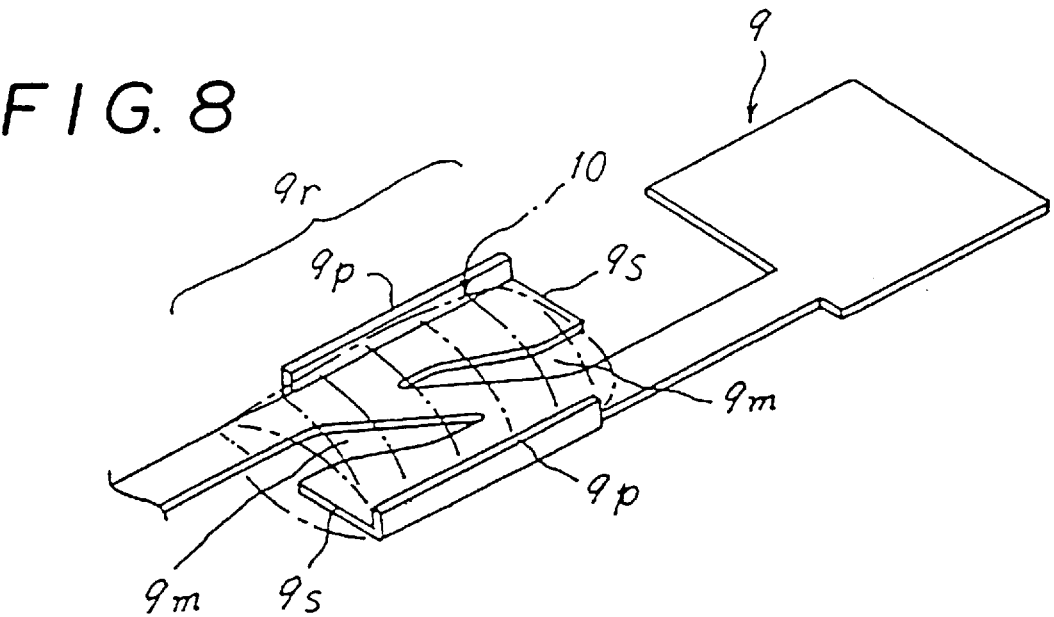
FIG. 8 is a detailed view of the vicinity of the spring edge in the device of FIG. 6.

FIG. 8 shows an enlarged view of the other spring edge (edge on the side of fixing member 9) in this Example.

In this Example, the spring material is formed by etching or pressing a metal plate. On S-shaped bent part 9r is provided in the vicinity of an edge of beam-formed spring 9 being slender nearly throughout its full length as shown in FIG. 8. At each of bent parts 9r, projecting part 9s projected nearly in parallel to the direction of the extension of spring 9 is provided. Further, wall part 9p is formed by bending the side of projecting part 9s as shown in FIG. 8 to provide the holding part for the damping material. To this holding part, gelatinous damping material 10 is applied.

In this Example, when the movable part of the device is displaced, damping material 10 held between spring bent part 9r and projecting part 9s is deformed in accordance with the deformation of spring 9 so as to absorb vibration. Thus, the undesired resonance of the movable part of the device is suppressed.

By the structure of this Example as described above, also, the gelatinous damping material can be provided without the need of enlarging the holding member and the fixing member and adding any further special parts for holding the damping material, so that not only can stable controllability be obtained, but also the optical system supporting member and the movable part thereof can be small and light. In addition, the trunk substrate is not required for electrically connecting the coils, so that the number of soldered parts is decreased and the workload is also reduced, leading to reduction of cost.

Figure 9:
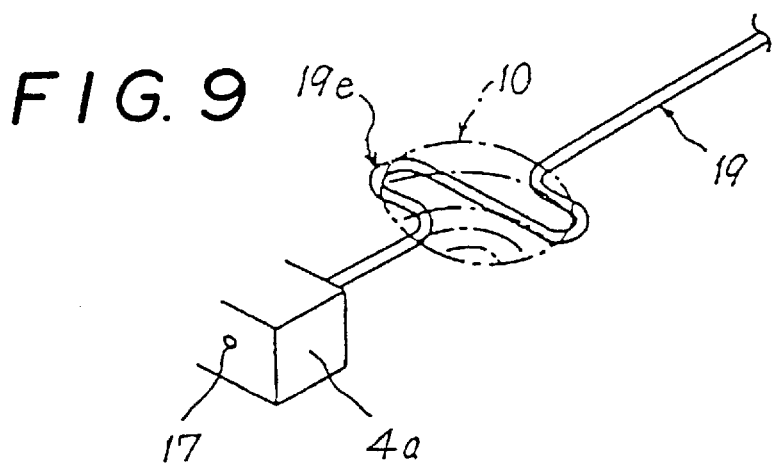
FIG. 9 shows a key portion, in particualr being a detailed view of the vicinity of a spring edge in a further form of optical system supporting device according to the first embodiment of the present invention.

FIG. 9 shows a further form of optical system supporting device (Example 4) according to the present invention.

FIG. 9 is a detailed view of the vicinity of an part of spring in this Example, wherein the tip of spring 19 is bonded through round hole 17 to fixing part 4a of holding member 4.

Thus, as shown in FIG. 9 with reference to the structure of the vicinity of the end part of spring on the side of holding member 4, in this Example, wire spring 19 is used as the supporting spring, round holes 17 are punched in respective spring fixing parts 4a and 8a of holding member 4 and fixing member 8, and both end parts of each of four springs 19 composed of a metallic wire are inserted in round holes 17 and bonded.

Further, bent part 19e as shown in FIG. 9 is provided in the vicinity of the end of each of four springs 19, and gelatinous damping material 10 is applied thereto. The center-wire distance formed at this bent part 19e is also so controlled that the damping material does not flow out and is held at the bent part as described in Example 2 using the same wire spring.

The other structural features are the same as in Example 1.

In the optical system supporting device according to this Example, when the movable part of the device is displaced, bent part 19e of spring 19 is deformed, followed by the deformation of damping material 10 held on bent part 19e so as to absorb vibration. Thus, any undesired resonance of the movable part of the device can be suppressed. The effect of this structure is the same as in Example 1. Accordingly, the optical system supporting device which is small and light and has excellent controllability can be realized readily with low cost. When the wire spring material is used, the above structure may be preferred.

Still a further form of optical system supporting device (Example 5) according to the present invention will be described with reference to FIGS. 10A and 10B.

Figure 10A:
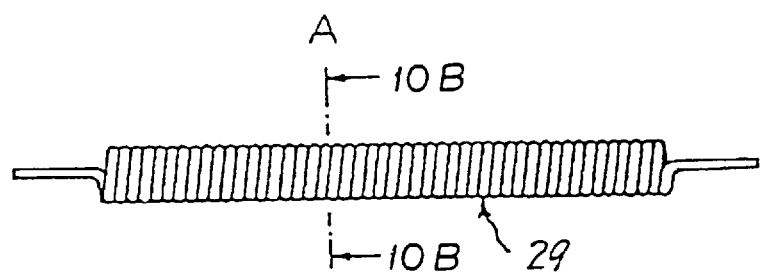
FIG. 10 shows a key portion, in particular being an enlarged view of a spring edge and a cross-sectional view of the spring in still a further form of optical system supporting device according to the first embodiment of the present invention.
Figure 10B:
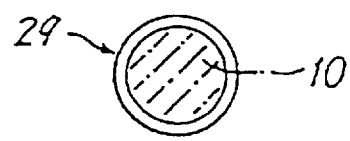

In this Example, coil spring 29 formed by cylindrically and closely coiling a metal wire is used as the supporting spring, an enlarged view of the spring end part is shown in FIG. 10A and a section taken on line B—B is shown in FIG. 10B. Gelatinous damping material 10 is filled into a space provided in the vicinity of the center portion of the metal wire-coiled spring 29. In this Example, four coil springs with the above structure are used for supporting holding member 8.

The bonding thereof to spring fixing parts 4a and 8a of holding member 4 and fixing member 8 may be conducted in the same manner as in Example 4.

In this Example, the other structural features may be the same as in Example 1.

In the optical system supporting device according to this Example using the above-mentioned coil spring 29, when the movable part of the device is displaced, the damping material 10 in coil spring 29 is deformed so as to absorb vibration. Thus, the undesired resonance of the movable part of the device can be suppressed.

The effect of the above structure is the same as in Example 1.

Still a further form of optical system supporting device (Example 6) according to the present invention will be described with reference to FIGS. 11 and 12.

Figure 11:
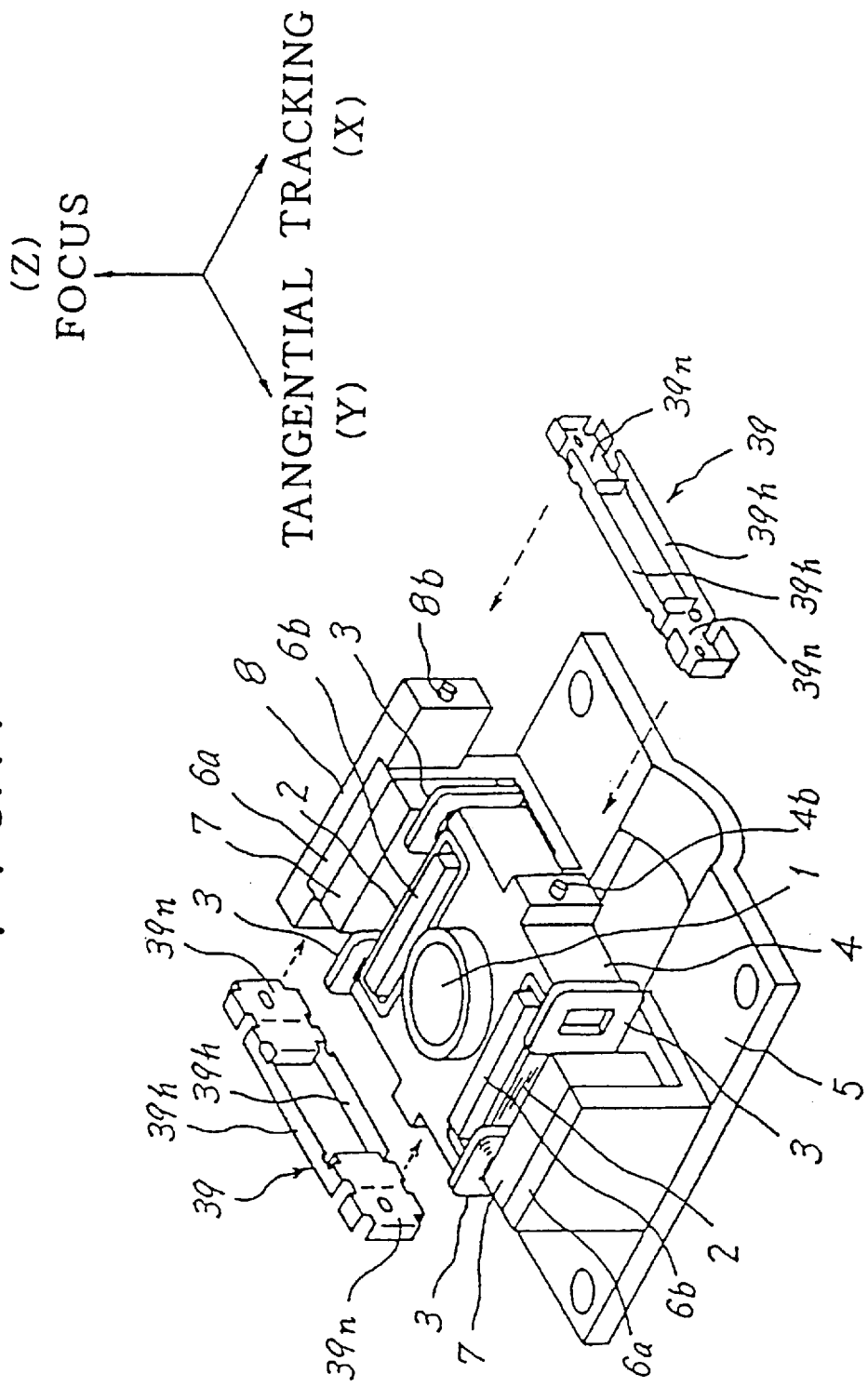
FIG. 11 is a perspective view showing the whole structure of still a further form of optical system supporting device according to the first embodiment of the present invention.

FIG. 11 shows the whole structure of the optical system-supporting device according to this Example. FIG. 12 shows an enlarged view of the vicinity of a spring edge.

The whole basic structure of the device is the same as in Example 1. Therefore, in FIG. 11, like parts and portions are given like numerals to omit the repetition of description. The major differences are described below.

In this Example, as shown in FIG. 11, spring 39 integrally formed with two springs by pressing is used as the supporting spring. That is, two springs 39 are used in this Example as different from four supporting springs used in each of the Examples as described above.

Figure 12:
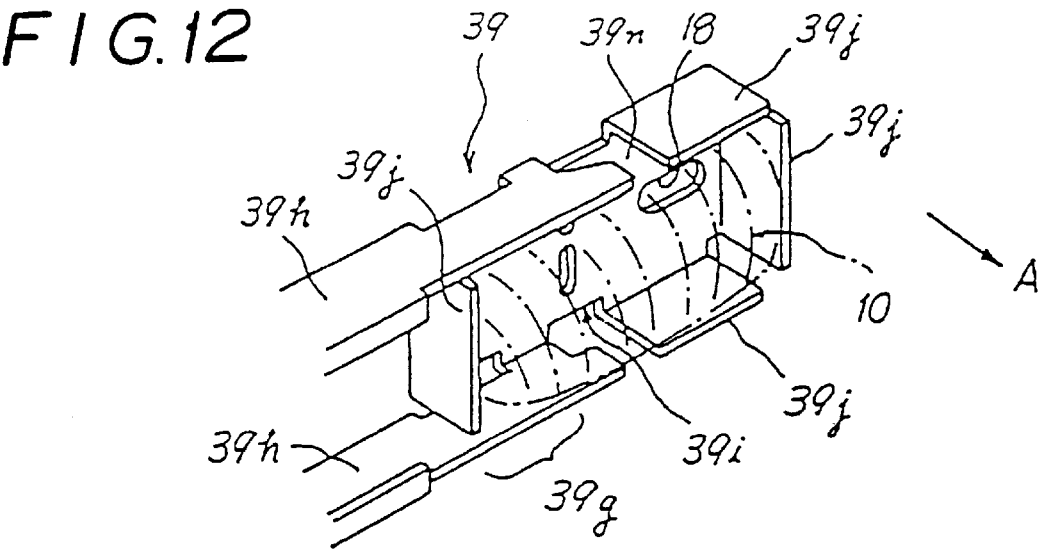
FIG. 12 is an enlarged view of the vicinity of a spring edge in the device of FIG. 11.

As shown in FIG. 12, spring 39 is supported by bending the side of the center part of beam-formed portion 39h in the center of spring 39. Further, only both side edges 39g of this beam-formed portion 39h are rendered deformable in the focal direction (Z direction in FIG. 11) as shown in FIG. 12. This may be realized by giving an appropriate cut.

For conducting the displacement in the tracking direction (X direction in FIG. 11) at bottom portion 39i of beam-formed portion 39h, beam-formed portion 39h is given a partiall cut, and the main body part 39n of the edge is provided with slits.

Further, as shown in FIG. 12, a holding part for damping material denoted as reference numeral 39i is formed by bending a part of the plate spring per se at the vicinity of the spring edge. Damping material 10 is filled in a boky portion surrounded by the above part 39i and beam-formed part edge 39g.

As a result, gelatinous damping material 10 is surrounded by the bent parts of spring 39, etc. nearly in five directions including main body part 39n of the edge. Therefore, when the damping material is applied, if the application of the gelatinous damping material is made, for example, in a manner such that the direction of arrow A in FIG. 12 is set upward, the flowing out of the gelatinous damping material can be prevented and the thickness of the gelatinous damping material can be made uniform, so that the gelatinous damping material can be appropriately arranged in the two-spring type spring 39 itself.

Further, hole 18 for fixing is formed in main body part 39n of the edge of spring 39. In this Example, spring 39 is bonded to holding member 4 and fixing member 8 in a manner such that protrudent fixing parts 4b and 8b of holding member 4 and fixing member 8 are fitted in hole 18.

In this Example, when the movable part supported by the above two springs 39 and 39 is displaced, damping material held between the springs is deformed so as to absorb vibration, so that the undesired resonance of the movable part of the device can be suppressed. In this Example as well, holding member 4 and fixing member 8 have no conventional container type structure for holding the gelatinous damping material.

By the structure of this Example as described above, the gelatinous damping material can be provided without the need of enlarging holding member 4 and fixing member 8 and adding any further special part. Thus, stable controllability can be obtained, and miniaturization and weight reduction can be made for the optical system supporting device and the movable part thereof. Further, as compared to each of the Example as described above, since two springs are integrally formed into one spring, the number of parts can be reduced, and also the number of work items can be reduced.

The present invention is not limited to the above-described Examples.

For example, in addition to the supporting device supporting the objective lens as an optical element in two directions as in the above-described Examples, the present invention is applicable to a supporting device permitting support in a focal direction only, and also applicable to a supporting device for galvanomirror.

Further, a liquid damping material, such as silicone oil, silica-filled silicone grease and an adhesive of butyl rubber, may also be used instead of the gelatinous damping material.

Still further, in the above Examples, a metal plate or wire spring is used as the supporting spring for the optical system supporting device. However, there is no limitation with respect to these supporting springs, and springs made of resins may also be used.

Examples of the second embodiment of the present invention will be described hereinbelow with reference to the drawings.

Figure 16:
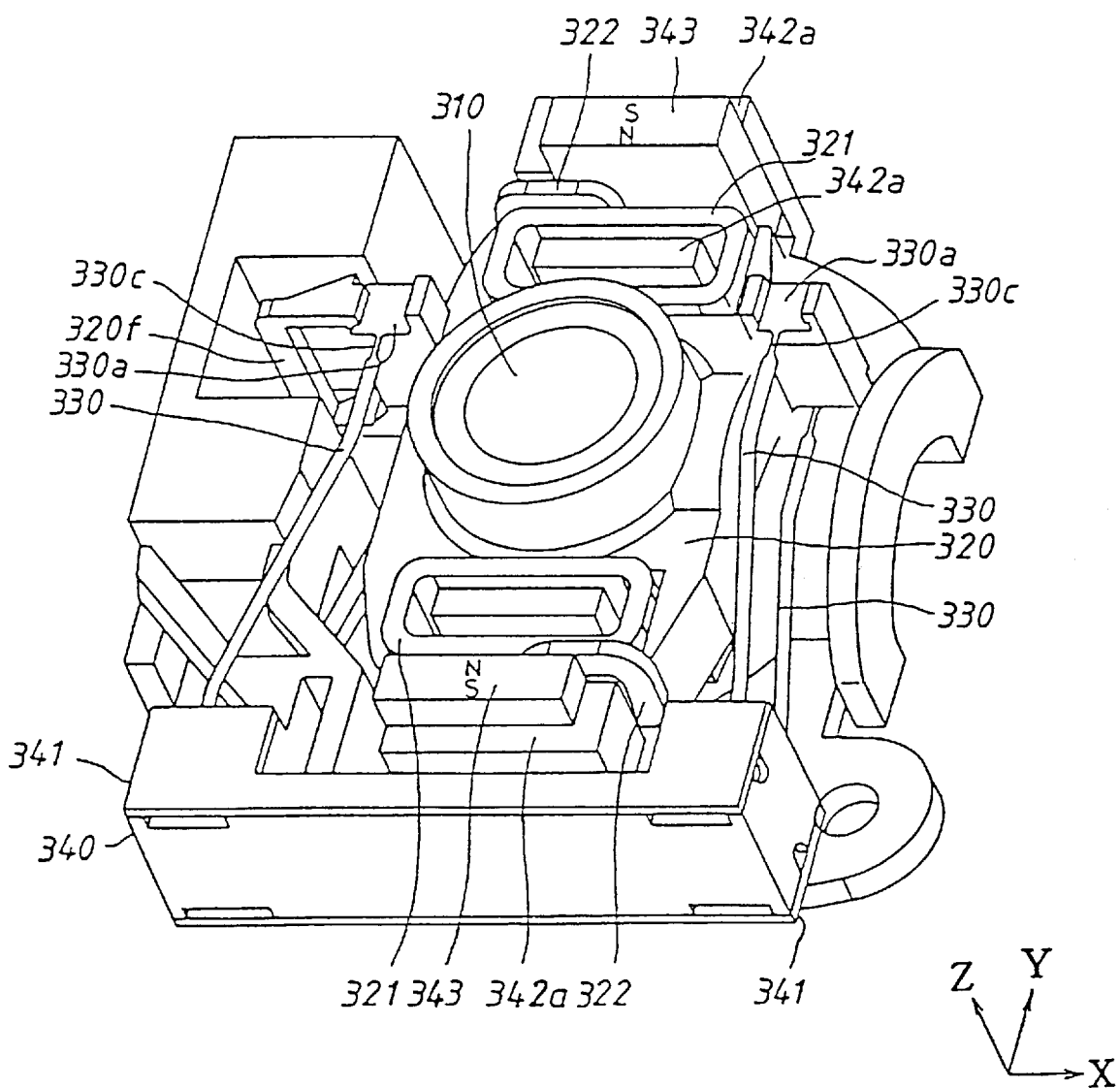
FIG. 16 is an entire perspective view showing one form of the optical system supporting device according to the second embodiment of the present invention.
Figure 17:
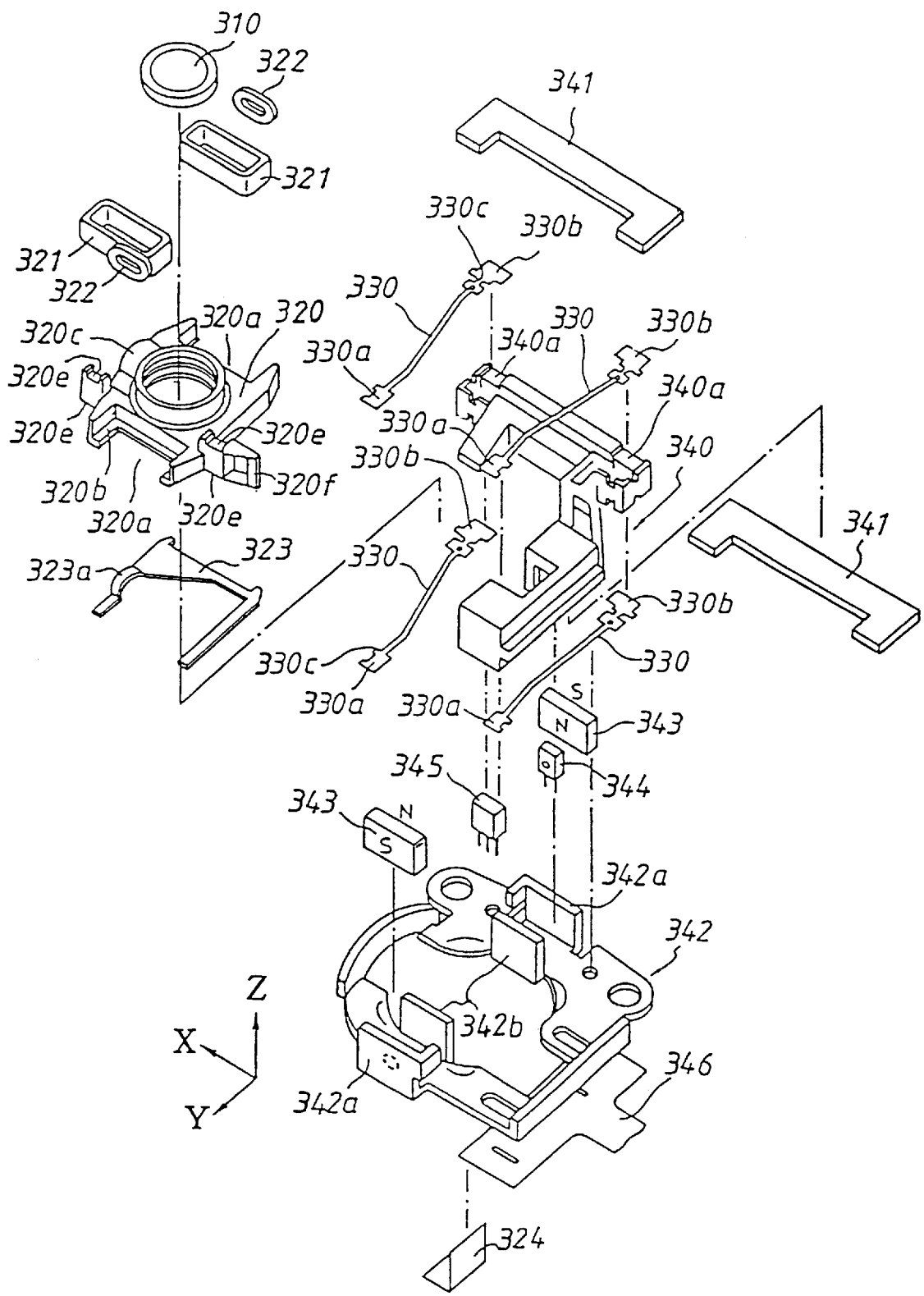
FIG. 17 is an exploded perspective view, as viewed from the oblique upper direction, of the above optical system supporting device according to the second embodiment of the present invention.
Figure 18:
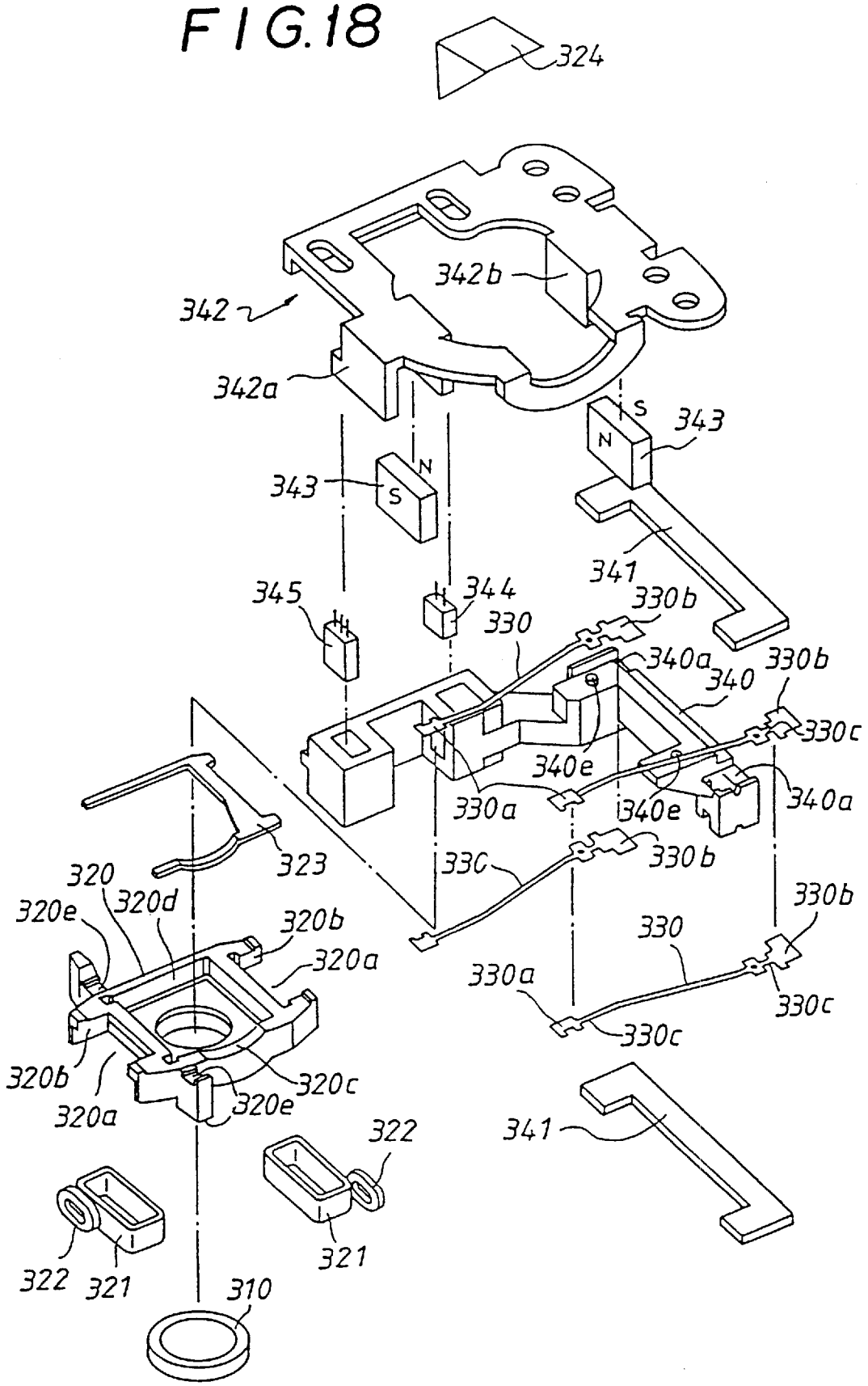
FIG. 18 is an exploded perspective view, as viewed from the oblique lower direction, of the above optical system supporting device according to the second embodiment of the present invention.

First, Example 1 of the,the second embodiment of the present invention will be described. FIG. 16 is an entire perspective view showing the optical system supporting device. FIG. 17 is an exploded perspective view of the optical system supporting device as viewd from an oblique upper side. FIG. 18 is an exploded perspective view of the optical system supporting device as viewd from an oblique lower side. In the device as shown in FIGS. 16 to 18, objective lens 310 is held on holding member 320, and this holding member 320 and fixing member 340 are connected via connecting member 330.

First, holding member 320 will be described below.

Notched parts 320a are formed on both edges of holding member 320 to fix focusing coil 321 and tracking coil 322. Protrudent part 320b is formed on the inside surface of this notched part 320a to position the mounting position of focusing coil 321. Then, balancer 323 is a plate of phosphor bronze, and is bonded along the periphery of the bottom surface of holding member 320, to enhance the warpage and torsional stiffness around the X direction of holding member 320 and to increase the resonance frequency. Recessed parts 323a and 320c are formed on balancer 323 and holding member 320, respectively. These are provided in order not to prevent the incident light flux to mirror 324 from an optical unit (not shown). Further, recessed part 320d of the bottom surface of holding member 320 is for arranging as closely as possible mirror 324 and holding member 320 while preventing contact therebetween.

Below, connecting member 330 will be described.

Connecting member 330 displaceably supports holding member 320 by having one end 330a being fixed to mounting surface 320e projected on the side surface of the above-mentioned holding member 320, and by having the other end 330b thereof fixed to mounting surface 340a of both ends of upper surface of fixing member 340. This connecting member 330 is prepared by etching a beryllium-copper plate. Narrow part 330c having a small in the X direction is formed on both edges of this connecting member 330. Mainly by the distortion of this part, holding member 320 is capable of diseplacing in the X and Y directions. Connecting member 330 is bent toward the inside in the X direction and mounted. The distance 330b—330b is larger than the distance 330a—330a. Thus, the size in the X direction of holding member 320 can be rendered small, and the torsional stiffness about the Y axis is improved.

Next, fixing member 340 will be described.

Mounting surface 340a as described in detail hereinbelow is provided on fixing member 340 to fix connecting member 330. Fixing member 340 is fixed to base 342 through boss 340e on the bottom surface thereof. Base 342 is molded by pressing one iron plate. Outside yoke 342a and inside yoke 342b forming a magnetic circuit are integrally formed with the base, and magnet 343 is bonded to the inside surface of outside yoke 342a. Reference numeral 344 denotes LED and reference numeral 345 denotes PD, by which the position of shielding member 320f of holding member 320 can be detected to thereby detect the position of objective lens 310 and the rate of movement thereof. Further, reference numeral 346 denotes FPC for signal transmission, which not only transmits LED 344 and PD 345 signals, but also supplies control current to focusing coil 321 and tracking coil 322.

The characteristics features of this Example will be described below.

Figure 19:
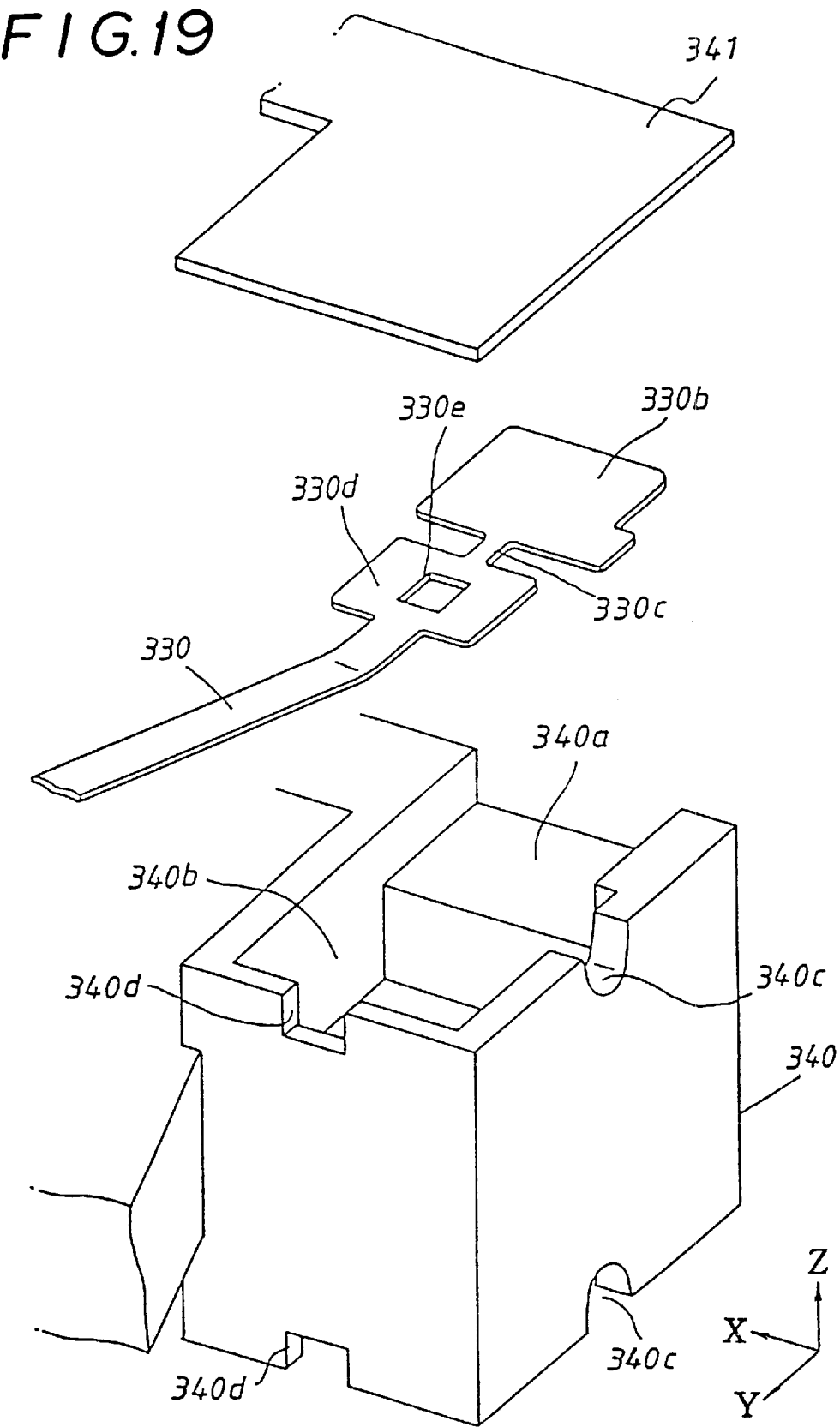
FIG. 19 is an exploded perspective view showing a key portion of the above optical system supporting device according to the second embodiment of the present invention.
Figure 20:
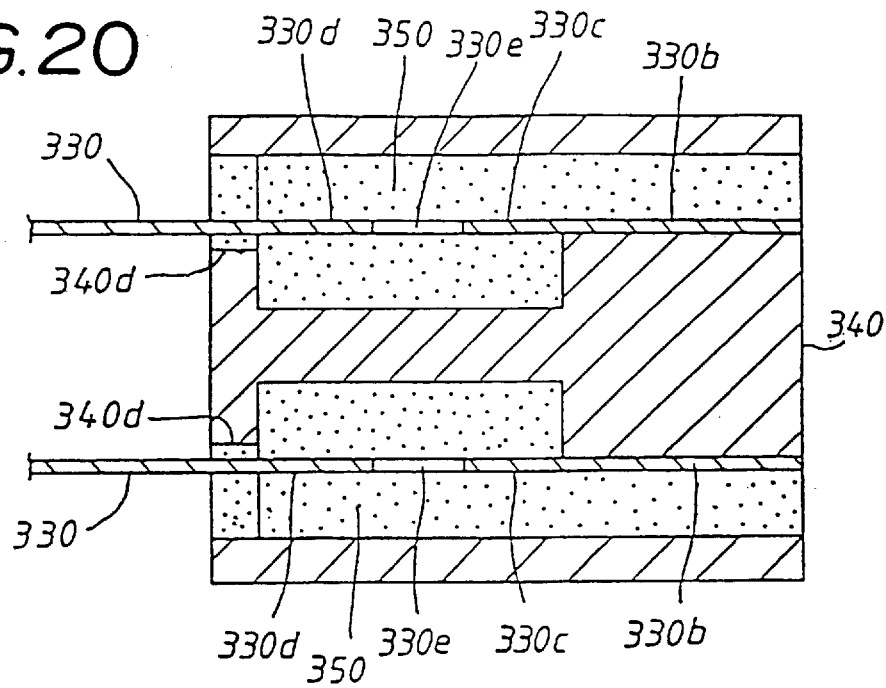
FIG. 20 is a cross-sectional view sowing a key portion of the aove optical system supporting device according to the second embodiment of the present invention.

FIG. 19 is an exploded perspective view showing a key portion of the optical system supporting device. FIG. 20 is a cross-sectional view sowing a key portion of the optical system supporting device. Both are enlarged views of connecting portions of connecting member 330 and fixing member 340. As shown in FIGS. 19 and 20, filling part 340b for filling damping material 350 is formed in a boky recessed form in fixing member 340, and charging hole 340c for charging the damping material is provided in its side. A copper foil pattern is formed on mounting surface 340a to solder edge 330b of the connecting member. On the other hand, in connecting member 330, width-enlarged part 330d and hole 330e are integrally formed as resistance increasing means, adjacent to the narrow part 330c. When edge 330d is soldered to mounting surface 340a, width-enlarged part 330b is arranged in filling part 340b, and connecting member 330 is extended outside through opening 340d. Thereafter, cover 341 is attached, and damping material 350 is charged to the filling part through charging hole 340c. Damping material is irradiated with ultraviolet rays, so that the material is cured. Cover 341 is made of a plastic capable of transmitting ultraviolet rays, and damping material 350 is composed of an ultraviolet curable gelatinous material containing silicone as a main ingredient.

The function of this Example will be described below.

When connecting member 330 is moved by a vibration of holding member 320, damping material 350 is deformed and flow to thereby have a viscosity such that the primary resonance is damped. With respect to the vibration up and down in the direction (Z), width-enlarged part 330d acts to increase damping resistance to thereby enhance the damping effect. On the other hand, with respect to the vibration to right and left in the direction (X), hole 330e holds damping material 350 to act so as to increase damping resistance to thereby enhance the damping effect.

As described above, in the optical system supporting device of this Example, width-enlarged part 330d and hole 330e are provided as resistance increasing means, so that the contact area between the connecting member and the damping material is increased to thereby enhance the damping performance. The coefficients of damping in the X and Z directions can freely be set by changing the shape, size and position of width-enlarged part 330d and hole 330e.

This Example may be modified as follows.

Figure 21:
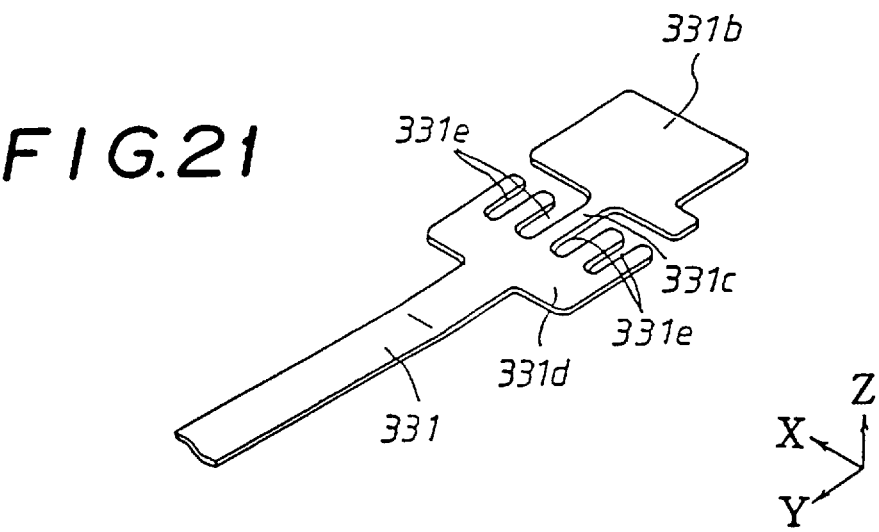
FIG. 21 is a view showing a modified form of the above optical system supporting device according to the second embodiment of the present invention.

(1) In the connecting member 331 shown in FIG. 21, the resistance increasing means is comprised of width-enlarged part 331d and hole 331e. Since a plurality of slits 331e are provided, the holding power of the damping material is improved to the vibration in the X direction, and it is feasible to selectively increase the coefficient of damping in the X direction only.

Figure 22:
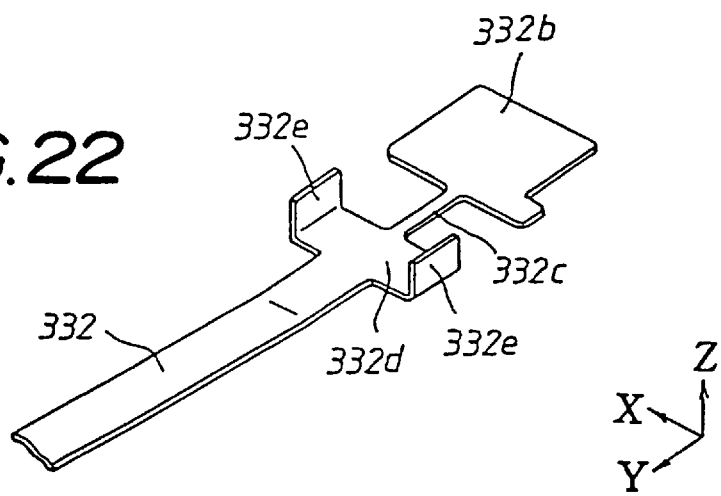
FIG. 22 is a view showing another modified form of the above optical system supporting device according to the second embodiment of the present invention.

(2) In the connecting member 332 shown in FIG. 22, the resistance increasing means is comprised of bent parts 332e provided on both ends of width-enlarged part 332d. Since the area of bent part 332e itself has damping activity in the X direction, higher coefficient of damping can be obtained in the X direction as compared with the above modification (1).

Figure 23A:
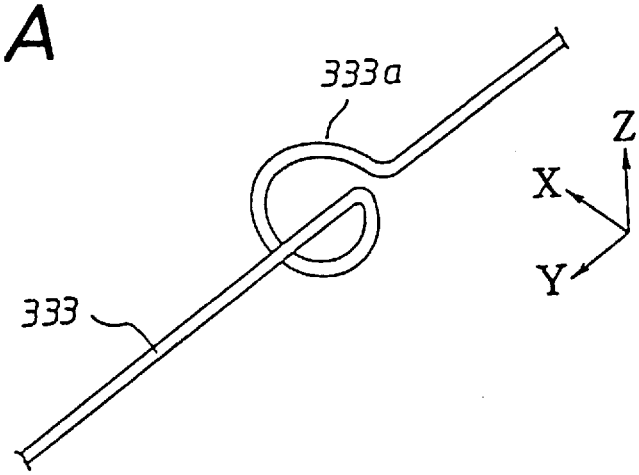
FIG. 23 is a view showing still another modified form of the above optical system supporting device according to the second embodiment of the present invention.
Figure 23B:
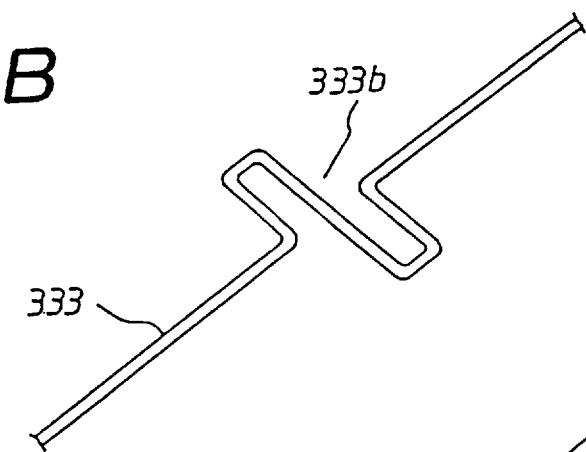
Figure 23C:
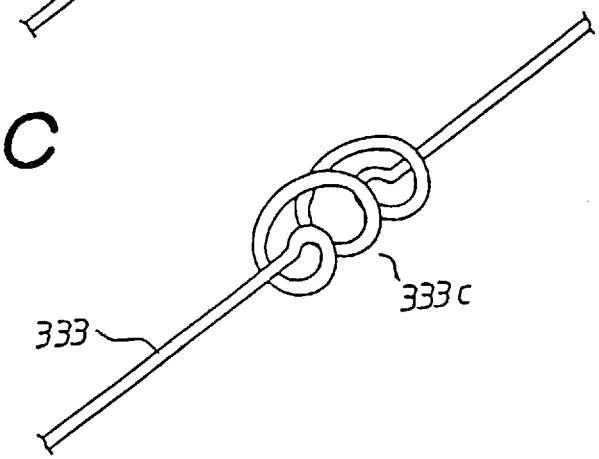

(3) FIG. 23 shows various connecting members each composed of wire spring 333. In one form, spring 333 is provided with circularly bent part 333a in a position to which the damping material is applied to thereby form a resistance increasing means. In this form, since the contact area with the damping material is increased, the coefficient of damping can be enhanced. In place of the circularly bent part, irregularly bent part 333b or spirally bent part 333c may also be formed as resistance increasing means. When these bent parts are present, the stiffness of the parts is lower than that of other linear parts. Thus, the deformation ratio is higher at the bent parts than at the linear parts, so that greater damping effect can be obtained.

Now, another form of optical system supporting device (Example 2) of the present invention will be described.

Figure 24:
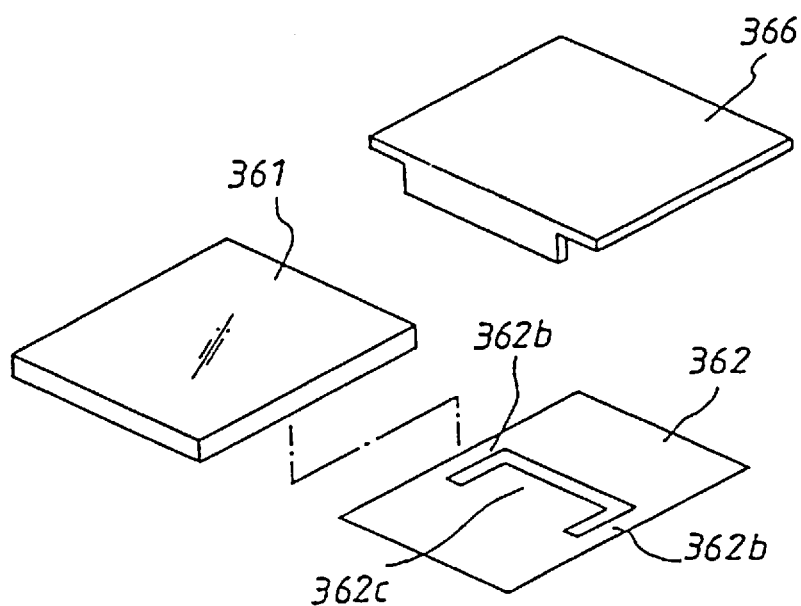
FIG. 24 is an entire perspective view showing another form of the optical system supporting device according to the second embodiment of the present invention.
Figure 24:
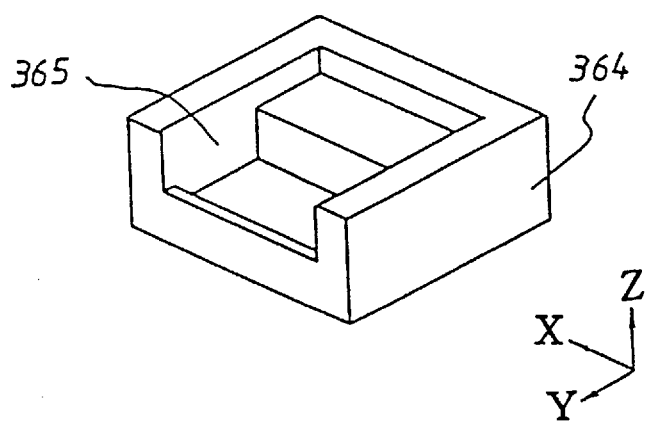

FIG. 24 is an exploded perspective view showing the optical system supporting device of Example 2. As shown in FIG. 24, in this Example, the present invention is applied to galvanomirror. Reference numeral 361 denotes a mirror as an optical element. Reference numeral 362 denotes a plate spring combining the holding member and the connecting member. Reference numeral 364 denotes a fixing member. Reference numeral 365 denotes a damping material. Reference numeral 366 denotes a cover. In this Example, U-shaped slit 362a is made in plate spring 362 composed of a thin metal plate. Mirror 361 is supported through both side portions 362b of the slit. On the other hand, inside part 362c surrounded by the U-shaped slit acts as resistance increasing means. In this Example, the contact area between U-shaped inside part 362c and damping material 365 is large, so that high damping performance can be obtained.

The present invention is not limited to the above Examples. For example, the present invention may be conducted as follows.

(1) Instead of the gelatinous damping material containing slicone, an acrylic resin or the like as a main ingredient, which is curable by irradiation with ultraviolet rays, heating, etc., use may be made of a liquid damping material, such as silicone oil, silica-filled silicone grease and an adhesive of butyl rubber.

(2) Instead of the resistance increasing means integrated with the connecting member, another part as resistance increasing means may be attached.

(3) In the above Examples, a part of the connecting member is arranged in the damping material. However, even if a part of the optical element or the holding member is arranged in the damping material, the same effect can be obtained.

What is claimed is:

1. An optical system supporting devices, comprising:
   an optical element,
   a holding member for holding the optical element,
   a fixing member having a damping material filling part substantially filled with a flowable damping material,
   a connecting member for connecting the holding member and the fixing member, the connecting member including, at at least one location, an integral resistance increasing means for providing an enhanced damping effect positioned in the damping material.

2. The optical system supporting device according to claim 1, wherein said resistance increasing means is an area-enlarged part provided on a part of the connecting member.

3. The optical system supporting device according to claim 1, wherein said resistance increasing means is an opening provided on a part of the connecting member.

4. The optical system supporting device according to claim 1, wherein said resistance increasing means is a slit provided on a part of the connecting member.

5. The optical system supporting device according to claim 1, wherein said resistance increasing means is a bent part provided on a part of the connecting member.

6. The optical system supporting device according to claim 5, wherein surfaces of said bent parts do not contact one another.

7. The optical system supporting device according to claim 1, wherein said connecting member is a wire spring, and said resistance increasing means is a circularly, curvedly or spirally bent part provided on a part of the connecting member.

8. The optical system supporting device according to claim 1, wherein a plate spring is used as the holding member and the connecting member, and said resistance increasing means is a slit opening provided on the plate spring.

* * * * *